Patented Nov. 16, 1926.

1,607,113

UNITED STATES PATENT OFFICE.

LOUIS BENDA, OF MAINKUR, NEAR FRANKFORT-ON-THE-MAIN, AND WERNER SCHMIDT, OF FECHENHEIM-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

P-DIALKYLAMINO ARYL PHOSPHINOUS ACIDS.

No Drawing. Application filed April 26, 1923, Serial No. 634,894, and in Germany May 24, 1922.

The process for the production of p-dialkylaminoaryl-phosphinous acids and their chlorides respectively, described by Michaelis (Ann. 260, 2 ff.) consists in treating the dialkylanilines with a highly excessive amount of phosphorus trichloride in the presence of aluminium chloride. The dialkylaminophosphenylchloride formed then is converted into phosphinous acids by various methods.

The reaction does not take place without danger of explosion and the process is therefore not workable on a technical scale.

Purification is extremely troublesome and wasteful and the results are bad accordingly.

It has now been discovered that the p-dialkylaminoarylphosphinous acids may be obtained in excellent purity and in a practically theoretical yield, by allowing phosphorus trichloride, best at the temperature of the water bath, to run into an excess of tertiary aromatic bases and then converting the arylphosphor chlorides formed, into the phosphinous acid salts, by means of caustic soda solution for instance. In order to facilitate stirring, it is in some instances advisable to employ a diluting agent such as benzene. The reaction passes off very smoothly, particularly also with dialkylarylamines substituted in the meta position by alkyls, halogens, alkoxy, dialkylamino groups, whereby the respective, hitherto unknown phosphinous acids, substituted in the ortho and para position for instance result:

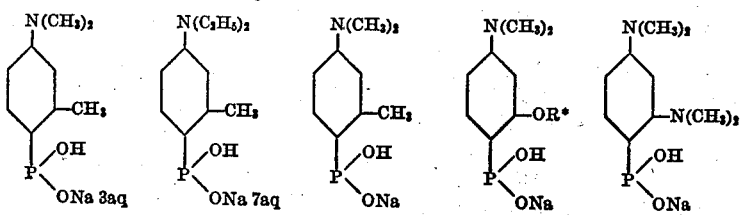

* R means alkyl

The compounds to be produced according to this process possess valuable therapeutic properties; they are also intended to serve as primary materials for the production of other pharmaceutical preparations.

*Example 1: Sodium salt of the 1-diamethyl-amino-4-phenylphosphinous acid.*

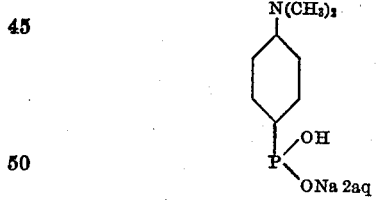

25 kg. dimethylaniline are mixed with 14 kg. phosphorus trichloride and gradually heated in the water bath whilst stirring, so that at a maximum temperature of the bath of 100° C. the inner temperature rises to 108° C. After stirring for 4 hours, the product of reaction is brought into 40 litres caustic soda solution 40° Bé. and 100 kg. ice whilst stirring, the excess of dimethylaniline is removed by distillating with steam and the alkaline solution boiled down. After sucking off, the crystals are washed in an ice-cooled, saturated solution of common salt and pressed. By recrystallizing from alcohol the compound is obtained in pure white needles or small plates, free from salt.

*Properties.*—Broad colorless needles with 2 molecules water of crystallization which is apt to easily desiccate. Very readily soluble in alcohol and cold water. Insoluble in ethyl ether, ligroine, chloroform or benzene.

The copper salt forms a slightly greenish powder, more difficultly soluble in hot, than in cold water. The white powder-like lead salt dissolves difficultly in water, as well as in alcohol.

The calcium salt is a colorless crystalline powder, easily soluble in water, but very difficultly in alcohol.

Example 2: Sodium salt of the 1-dimethyl-amino-3-methyl-4-phenylphosphinous acid.

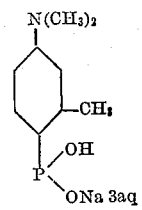

25 kg. dimethyl-m-toluidine are mixed with 14 kg. phosphorus trichloride, whilst stirring, and gradually heated in the salt bath. At a maximum temperature of the bath of 108° C., the temperature of the mixture of reaction rises to 127° C., falling however quickly down to 90° C. The creamy product of reaction is stirred into 40 litres caustic soda solution 40° Bé. and 100 kg. ice, the excess of dimethyl-m-toluidine is removed by steam distillation and the alkaline solution boiled down. As soon as a test crystallizes when cooled down, the solution is placed on ice. After sucking off, the crystals are washed with an ice-cooled solution saturated with common salt and then pressed. By recrystallizing from alcohol, the compound free from salt, forming pure white, small plates or needles, is obtained.

*Properties.*—Very distinctly shaped scales, needles or prisms. The crystals contain 3 molecules crystallization-water which is easily apt to desiccate and are readily soluble in cold water and hot alcohol.

The potassium salt deliquesces by the influence of air. The copper salt forms a slightly greenish-yellow, the ferrous salt a slightly brownish-yellow powder, both difficultly soluble in water and organic solvents.

The calcium salt dissolves readily in water and less so in alcohol or in the ethyl ether of the acetic acid, from which it crystallizes in the shape of beautiful, very small needles.

Example 3: Sodium salt of the 1-diethyl-amino-3-methyl-4-phenylphosphinous acid.

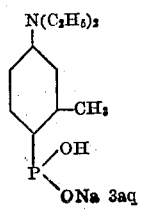

33 kg. diethyl-m-toluidine are heated to 75° C. and mixed with 14 kg. phosphorus trichloride, previously heated to 50° C., whilst stirring. In a short while the temperature of the mixture rises to 133° C., falling again thereafter. Stirring is continued until the inner temperature has decreased to 75° C. The product of reaction is stirred into 40 litres caustic soda solution 40° Bé. and 100 kg. ice, the excess of diethyl-m-toluidine is removed by distilling with steam, and the alkaline solution boiled down until crystallizing takes place. After sucking off, the crystals are washed with an ice-cooled solution, saturated with common salt and pressed. By recrystallizing from alcohol the compound is obtained as pure white prisms.

*Properties.*—Beautiful prisms, containing 3 molecules crystallization-water desiccating very easily. Very readily soluble in cold water and warm alcohol, insoluble in ethyl ether, benzene, naphtha.

The copper salt represents a slightly greenish-yellow powder, insoluble in water and sparingly soluble in alcohol.

The calcium salt is obtained from alcohol or ethyl acetate in exceedingly beautiful, very small needles. It is easily soluble in water. If the bases named in the afore-stated examples are substituted by others, as for instance 3-chloro-1-dimethyl-aniline, 3-alkoxy-1-dimethyl-aniline, tetramethylmetaphenylenediamine and others to advantage applied in excess quantities, the respective phosphinic acids result.

Claims:

1. A process of manufacturing p-dialkyl-amino-arylphosphinous acids by heating phosphorous trichloride with an excess of tertiary aromatic bases unsubstituted in the para position.

2. A process of manufacturing 1-dimethyl-amino-3-methyl-4-phenylphosphinous acid by heating phosphorus trichloride with an excess of 1-dimethylamino-3-methylbenzene.

3. As new products the salts of the dialkylaminoarylphosphinous acids substituted in the meta position relative to the dialkylamino radical, the constitution of which corresponds to the formula:

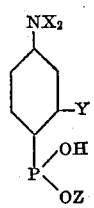

in which formula X means an alkyl radical, Y means any substituent and Z means a cation.

4. As a new substance the sodium salt of 1-dimethylamino-3-methyl-4-phenylphosphinous acid, the constitution of which corresponds to the formula
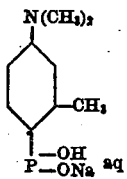
and forming pure white crystals readily soluble in cold water and hot alcohol.
In witness whereof we have hereunto signed our names this 29th day of March, 1923.
LOUIS BENDA.
WERNER SCHMIDT.